United States Patent [19]
Knop et al.

[11] Patent Number: 5,809,429
[45] Date of Patent: Sep. 15, 1998

[54] RADIATING COAXIAL CABLE AND RADIO COMMUNICATION SYSTEM USING SAME

[75] Inventors: Charles M. Knop, Lockport; Edward L. Ostertag, New Lenox; Gregory S. Orseno, Lockport, all of Ill.

[73] Assignee: Andrew Corporation, Orland Park, Ill.

[21] Appl. No.: 532,141

[22] Filed: Sep. 22, 1995

[51] Int. Cl.⁶ .............................. H04B 5/00; H01Q 13/22
[52] U.S. Cl. .......................... 455/523; 333/237; 343/770; 379/55.1; 375/257
[58] Field of Search ........................... 333/237; 343/770; 455/41, 55.1, 523; 379/55, 55.1; 340/552; 375/257

[56] References Cited

U.S. PATENT DOCUMENTS

| | | | |
|---|---|---|---|
| 2,971,193 | 2/1961 | Siukola ................................... 343/770 |
| 3,031,666 | 4/1962 | Butler ..................................... 343/771 |
| 3,648,172 | 3/1972 | Nakahara et al. .................. 333/237 X |
| 3,691,488 | 9/1972 | Holtum, Jr. ............................ 333/237 |
| 3,781,725 | 12/1973 | Yoshida et al. ....................... 343/771 |
| 3,909,757 | 9/1975 | Miyamoto et al. ................. 343/770 X |
| 3,963,999 | 6/1976 | Nakajima et al. ..................... 333/237 |
| 4,280,225 | 7/1981 | Willis .................................... 455/55.1 |
| 4,322,699 | 3/1982 | Hildebrand et al. .................... 333/237 |
| 4,339,733 | 7/1982 | Smith ..................................... 333/237 |
| 4,366,457 | 12/1982 | Bode et al. ............................. 333/237 |
| 4,599,121 | 7/1986 | Edwards et al. .......................... 156/48 |
| 4,625,187 | 11/1986 | Bocher ................................... 333/237 |
| 4,660,007 | 4/1987 | Edwards et al. ........................ 333/237 |
| 4,800,351 | 1/1989 | Rampalli et al. ....................... 333/237 |
| 5,291,164 | 3/1994 | Levisse .................................. 333/237 |
| 5,414,437 | 5/1995 | Mahnad ................................. 343/770 |
| 5,432,838 | 7/1995 | Purchase et al. ......................... 379/55 |

FOREIGN PATENT DOCUMENTS

| | | | |
|---|---|---|---|
| 0 300 147 | 1/1989 | European Pat. Off. ....... H01Q 13/20 |
| 8201456 | 1/1982 | France . |
| 26 28 755 | 1/1978 | Germany ....................... H01Q 21/06 |
| 56811 | 5/1977 | Japan ................................... 455/55.1 |
| 89136 | 5/1985 | Japan ....................................... 455/41 |
| 62-295525 | 12/1987 | Japan . |
| 63-287104 | 11/1988 | Japan . |
| 2-288604 | 11/1990 | Japan . |
| 739618 | 11/1955 | United Kingdom ................... 343/770 |
| 1324180 | 7/1973 | United Kingdom ................... 343/770 |

OTHER PUBLICATIONS

Martin, D.J.R., "Radio Communication in Mines"; *The Mining Engineer;* Dec. 1977/Jan. 1978 issue; pp. 275–282.

*Electrical Communications* Jan. 1, 1994; pp. 66–73; A. Levisse; "Radiating Cables –Channel Tunnel Applications".

Gale DJ, and Beal JC, Comparative Testing of Leaky Coaxial Cables for Communications and Guided Radar, *IEE Trans. MTT,* 1980; vol MTT–28, No. 9, 1006–1013. no month.

Sako T, Misawa S, Naruse T, Yasuhara H, Oguchi M and Kato T. Leaky Coaxial Cable. *Fujikura Technical Review,* 1974; 26–39.

Ries E and Cuccia C. Status Report: Communications in Mass Transit Guided–Roadway Systems. *Microwave Systems News,* 1975; 24–42 no month.

(List continued on next page.)

*Primary Examiner*—Benny T. Lee
*Attorney, Agent, or Firm*—Arnold, White & Durkee

[57] ABSTRACT

A radiating coaxial cable comprises an inner conductor, a layer of cellular foam dielectric material surrounding the inner conductor, and a single, continuous, corrugated outer conductor surrounding the dielectric foam layer in direct contact with it. The outer conductor forms at least one row of slots which are configured to produce a radiated field polarized perpendicularly to the axis of the cable to substantially avoid the radiation of a field polarized parallel to the axis of the cable and to provide coupling energy between the interior of the cable and the slots. In this way a substantially constant near-field pattern is produced along the length of the cable across the bandwidth of the cable.

27 Claims, 11 Drawing Sheets

OTHER PUBLICATIONS

Milligan TA. *Modern Antenna Design.* McGraw–Hill Book Co., NY, 1985; 92–93. no month.

Levisse A. Leaky or Radiating? Radiation Mechanisms of Radiating Cables and Leaky Feeders—Channel Tunnel Applications. *Int Wire & Cable Symp Proc;* 1992; 739–747. no month.

Aihara K, Sakata Y and Tago N. Ultra–High–Bandwidth Heat Resistant Leaky Coaxial Cable. *Intl Wire & Cable Symp Proc,* 1992;732–738. no month.

Coraiola A, Haag HG, Schulze–Buxloh and Thönnessen G. Leaky Coaxial Cable With Length Independent Antenna Receiving Level. *Intl Wire & Cable Symp Proc;* 1992; 748–756. no month.

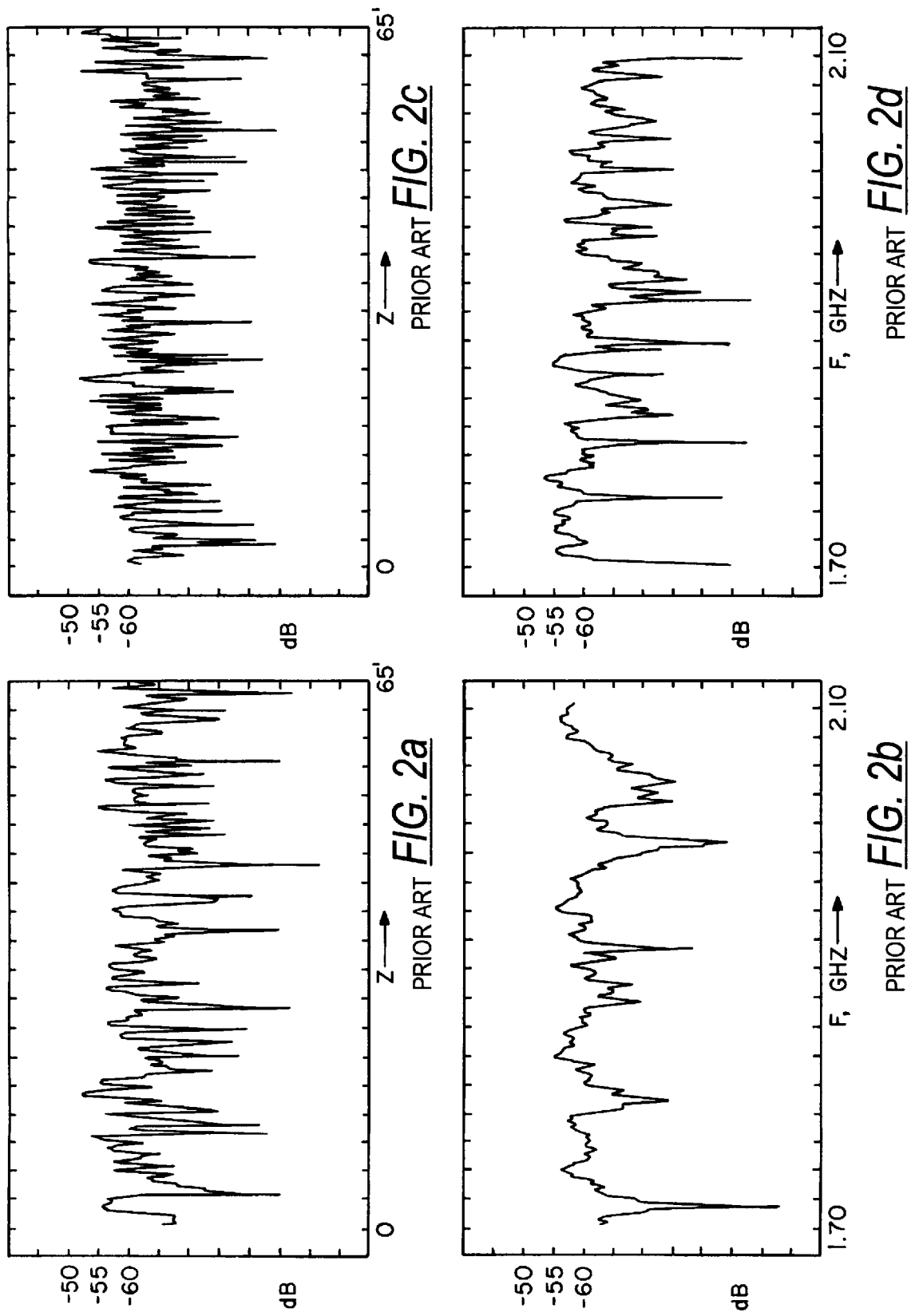

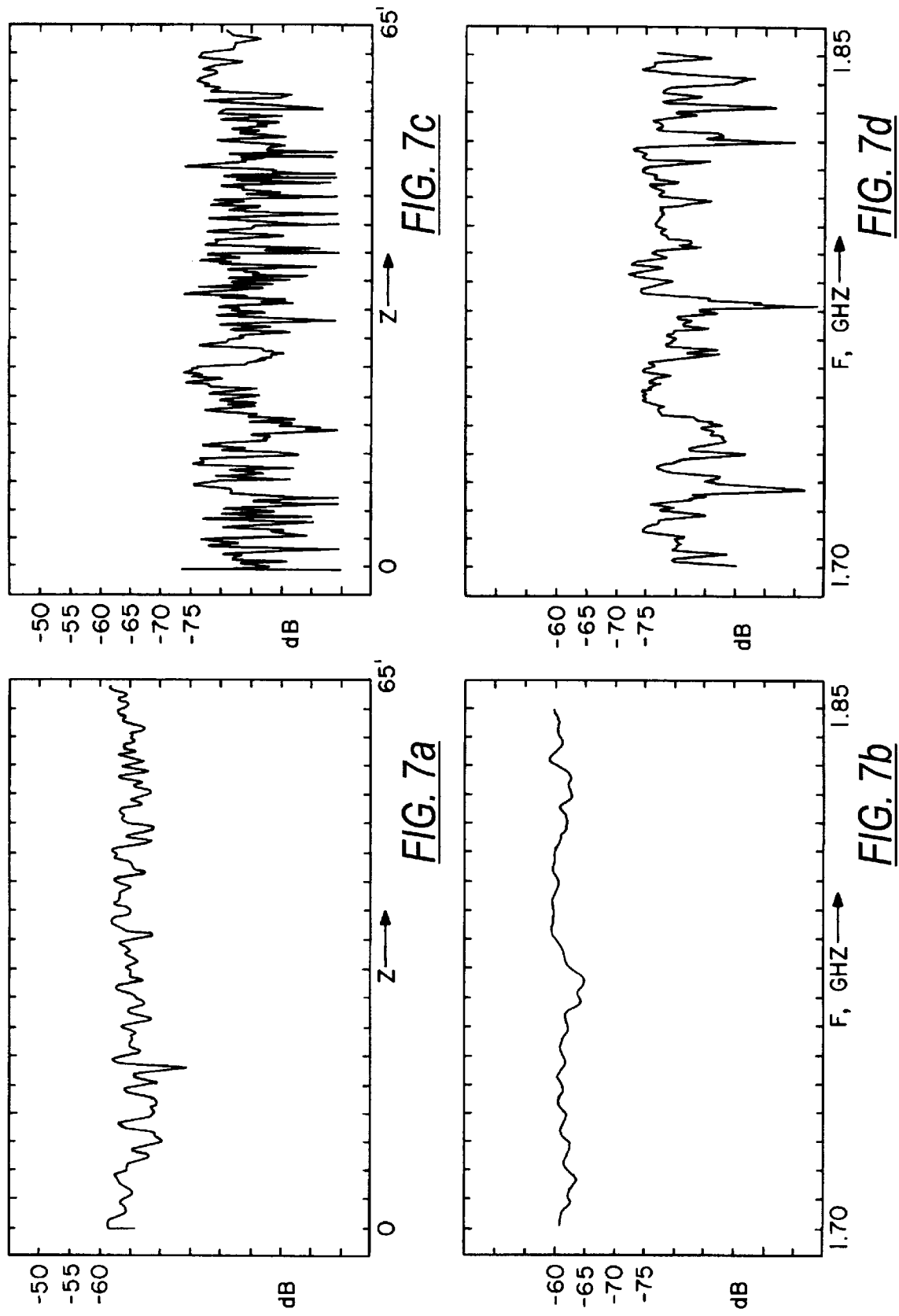

RADIATING COAXIAL CABLE AND RADIO COMMUNICATION SYSTEM USING SAME

FIELD OF THE INVENTION

The present invention relates generally to radiating transmission lines, particularly slotted coaxial cables, and to radio communication systems that use such radiating transmission lines.

BACKGROUND OF THE INVENTION

Radiating coaxial cable has been used for many years in various types of radio communication systems. A typical layout is shown in FIG. 1 where a cable of length L (extending along an axis z with one end of the cable located at z=0 and the other end attached to a load at location z=L) produces a near field at the point P (ζ,z) where the field is received by a "pick-up" horn H (whose axis makes an angle Θ relative to the cable's axis) connected to a receiver R. At any given frequency, the field strength produced by such a cable can fluctuate rapidly as a function of the near-field axial position (i.e., ζ is constant, z is variable) along the length of the cable. Also, at any such near-field point along the length of the cable, the strength of the field produced by such a cable can vary rapidly as a function of frequency. For example, such fluctuations can be seen in FIG. 2a which shows the measured field strength in (decibels (hereinafter "dB") versus axial distance (hereinafter "z") along the cable at a given frequency for a coaxial radiating cable having many slots per wavelength. Superimposed upon these fluctuations is a gradual reduction in average field strength owing to the line's ohmic attenuation. The fluctuations along the cable are seen to be typically on the order of ±10 dB (but can approach −20 db). Similarly FIG. 2b shows the measured field strength in dB versus frequency in gigahertz (hereinafter "GHz") at a given distance along the cable. Examination of FIG. 2b discloses that at any given receiving location along such a radiating cable, a system which requires a large bandwidth can have up to a 20-dB null in a given bandwidth, which can make the signal unrecoverable. As a result, such coaxial radiating cables are not generally acceptable for use in digital communication systems requiring low bit error rates ("BERs"). Digital data communications, for example, may require BERs as low as $10^{-8}$ to avoid significant data losses, and even digitized voice communications require BERs of $10^{-2}$.

One contemporary form of such a highly fluctuating radiating coaxial cable consists of a foam dielectric coaxial cable with a corrugated outer conductor which has radiating slots cut through the peaks of the corrugations. The foam dielectric reduces the phase velocity, v, inside the cable to between 80% and 90% of the speed of light, c, i.e., v/c=0.80 to 0.90. This means that the wavelength inside the cable, i.e., the cable, guide, or wavelength $\lambda_g$, is 80% to 90% of the free space wavelength $\lambda_v$. The corrugations and thus the slots are typically spaced at 4 or more per inch, leading to at least 20 slots per $\lambda_g$ at the highest frequency used ($\lambda_g$=5.558" for 80% velocity at 1700 MHz). The near-field patterns of this type of cable are highly oscillatory, as shown in FIGS. 2a and 2b, leading to excessive signal losses and high BERs. This type of cable produces both co-polar (i.e., transverse or perpendicular to the cable) and cross-polar (i.e., axial or parallel to the cable) components of electric field of about negligible difference (i.e., equal magnitude), as can be seen from the measured co-polar components of FIGS. 2a and 2b and the corresponding measured cross-polar patterns of FIGS. 2c and 2d.

A second type of radiating coaxial cable has slots which are slanted with respect to the cable's axis (or a group of such slots to achieve wider bandwidth) spaced at periodic intervals $\lambda_g$ along the length of the cable with the slant being the same from slot to slot. This same-slantedness and approximately $\lambda_g$ slot spacing puts the transverse electric (co-polar) fields in the slots in phase, and thus all the slots radiate a transverse-polarized field off the cable at the same angle, Θ̂, of nearly 90° from the cable's axis. Unfortunately, the axial-electric (cross-polar) fields are also in phase and hence also radiate at an angle of 90° off the cable (though they are, typically, weaker, relative to their co-polar component, as compared to that for the first type of radiating cable (having many slots per $\lambda_g$) since this second type has slots which are longer in the axial direction than in the transverse direction and are only slightly tilted relative to the axis). Thus the co-polar pattern of this second type of radiating cable has smaller fluctuations than that of the first cable type.

A third type of radiating coaxial cable with about $\lambda_g/2$ slot spacing and using reversed zig-zag-shaped slots has also been used. This arrangement also causes the transverse-electric (co-polar) fields to be in phase and radiate at nearly 90° from the cable's axis but causes the axial-electric (cross-polar) fields to be nearly out of phase (exactly so for $\lambda_g/2$ slot spacing which, like $\lambda_g$ spacing in the second type of cable, is never used since a high input reflection occurs (i.e., the input VSWR to the cable "sees a spike")). This third type of radiating coaxial cable thus provides superior co-polar patterns as compared to those of the first and second types, but still radiates a substantial cross-polar component of electric field. For example, the measured co-polar and cross-polar components from a typical zig-zag cable are shown in FIGS. 3a through 3d as there defined (note that by comparing FIGS. 3a with 3c or 3b with 3d that the cross-polar component is about −7 to −9 dB relative to the co-polar).

The above cross-polar (axial) electric field is undesirable since it produces a "two-wire line effect" (hereafter referred to as "TWLE") where the outer metallic surface of the cable forms one line and an adjacent parallel surface (wall, floor, ceiling, etc.) forms the return line. The outgoing and return currents on this line produce a standing wave of current along the outside of the cable traveling at the speed of light (since the space between the cable and the wall is typically filled with air). This standing wave current also radiates and, when superimposed on that radiated from the slots, produces, typically, a highly oscillatory field. The strength of these oscillations is diminished (and can, in fact, in the absence of reflections, be made sufficiently small) by spacing the cable an adequate distance away from the wall. Thus, because of the TWLE, a cable having a cross-polar component cannot produce a sufficiently non-oscillatory field unless (in the absence of reflections) it is adequately spaced from the wall. The first type cannot produce such a result even in free spaces i.e., even in the absence of a wall or other adjacent surface. This TWLE effect is seen from the measurements made on, for example, the third type (zig-zag) of cable, where the measured co-polar field of FIG. 3a (that measured when the cable is put against a dry-wall with slots pointing away from the wall) degrades to that of FIG. 3aa (that measured when the cable is put against the same dry-wall covered with a 3 foot wide metallic strip with, again, the slots pointing away from the wall). Regarding the first type of cable, its patterns are so bad (many deep oscillations) even against a dry-wall (FIG. 2a or 2b) that the further degradation due to a metallic wall is inconsequential.

The second type of cable will be better than the first but worse than the third when a metallic wall is present.

A fourth type of radiating cable, more recently developed, similar to the second type above, employs a number of slots forming a group or cell, where all the slots are tilted relative to the cable's axis, and where the groups or cells are repeated at specific intervals. The slots in each cell are arranged such that at any given frequency in the specified bandwidth only one constant phase-front is radiated. Thus, this type of cable can increase the bandwidth beyond that of the second and third types described above. However, the slots radiate both axial and transverse polarizations, and this cable also produces a TWLE due to its axial currents. Thus, it too must be mounted a substantial distance away from a wall (or floor, ceiling, etc.) if a sufficiently non-oscillatory field is to be produced (in the absence of reflections), although, like the second and third cable types, the field it produces has less fluctuations than that of the first type of cable described above.

The above-described wall spacing requirement imposed on the aforementioned four types of coaxial cable radiators, to achieve a sufficiently non-oscillatory field, makes them vulnerable to mechanical vibrations, air-vortex and physical damage. Also, because the cross-polar component of the signal radiated from all four types of cables can be reflected (especially in an indoor environment) from nearby walls, floors, etc., and be reconverted to a co-polar signal, this reflected converted co-polar signal can add destructively with the directly radiated co-polar signal, again giving rise to an oscillatory net field. Thus the latter three types of coaxial radiating cable must be operated close to the observation point (typically 5 feet or less) if a satisfactory low-oscillatory field is to be realized. The first type still has a highly oscillatory field area at these close distances.

Thus, when any of the radiating cables described above are used in radio communication systems, the amplitude fluctuations of the near field, at a given observation point, can vary widely with frequency across the operating bandwidth. The amplitude of the near-field fluctuations can, at a given frequency, also vary widely along the length of the cable. Both of these near-field fluctuations can lead to unacceptable signal loss or BERs. This poor performance is attributed to the high level of cross polarization produced by all of the above cable types (e.g., about 0 dB, higher than −7 dB, −7 dB, and higher than −7 dB, for the four cable types, respectively). Thus, there is a need for an improved radiating transmission line that is suitable for use in radio communication systems, where this improvement requires that the co-polar radiation have small amplitude fluctuations and that the cross-polarization radiation be as low as possible.

SUMMARY OF THE INVENTION

It is a primary object of the present invention to provide an improved radiating coaxial cable that has very low cross-polarization (i.e., that has a polarization parallel to the cable's axis which is very low) and hence will provide the attainment of low BERs when used for digital communications, minimize distortion when used for analog communications, and have lower transmission loss than existing coaxial cable radiators.

It is another object of this invention to provide such an improved radiating coaxial cable that is capable of producing a co-polarized signal (that perpendicular to the cable) having a substantially flat frequency response, i.e., small field strength fluctuations, at any fixed-arbitrary near-field point, across the entire frequency bandwidth of the cable. A related object of the invention is to provide such a system which produces, at a given frequency, a co-polarized near-field pattern having small field strength fluctuations along the entire effective length of the radiating cable (where the effective length is equal to the length of the coaxial cable $L_o$ but commencing at $Z=Z_{start}=\zeta/\tan \hat{\Theta}$ and ending at $Z=L_o+Z_{start}$, where $\hat{\Theta}$ is the constant phase front angle).

A further object of the invention is to provide such an improved radiating coaxial cable which, since it avoids any significant generation of cross-polarized fields, does not produce a TWLE or reflected cross-polar signals which reconvert to co-polar signals. A related object is to provide such a radiating coaxial cable which avoids any significant radiation attenuation of signals propagated longitudinally through the cable.

Yet another object of this invention is to provide such an improved radiating coaxial cable which can be mounted close to, or even on, a wall (even a metallic wall) or other surface without significantly degrading the operation of the radio communication system in which the radiating cable is used.

Still another object of the invention is to provide such an improved radiating coaxial cable which greatly reduces the problem of multipath-reflected cross-polar signals being reconverted to co-polar signals and hence allows either a small or large separation between the radiating cable and the receiver.

It is a further important object of this invention to provide an improved radiating coaxial cable of the type described above which also has a relatively wide bandwidth (e.g., about 3:1).

A still further object of the invention is provide such an improved radiating coaxial cable that can be efficiently and economically manufactured in long lengths.

Another object of this invention is to provide an improved radio communication system using such improved radiating coaxial cable.

Other objects and advantages of the invention will be apparent from the following detailed description and the accompanying drawings.

In accordance with the present invention, the foregoing objectives are realized by providing a radiating coaxial cable which includes one or more rows of slots to produce a radiated field polarized perpendicularly to the axis of the cable, and to substantially avoid the radiation of a field polarized parallel to the axis of the cable. The dimensions and location of the slots in the outer conductor of the cable are selected so as to produce, at any given point in the near field, a near-field pattern having only small amplitude fluctuations across the operating bandwidth. Also, at any given frequency within the operating bandwidth, the radiating cable produces a near-field pattern having only small amplitude fluctuations along the effective length of the cable. The near-field amplitude fluctuations of the radiating cable are preferably less than about ±3 dB in either an indoor or outdoor environment over the operating bandwidth of the system and along the effective length of the cable (and at any perpendicular distance, $\zeta$, from the cable ranging from about 1 foot to about 50 feet).

Because of the substantially flat near-field pattern (i.e., the small amplitude fluctuations), the system of this invention yields extremely low BERs when used for digital communications, and low levels of distortion when used for analog communications, all at low loss. The system also has a wide bandwidth, so that data can be transmitted at high data rates.

The improved radio communication system of this invention includes the above radiating cable located within or adjacent to a prescribed area containing a multiplicity of radio transmitters, receivers or transceivers ("radio units"), which may be either mobile or fixed. Signals are transmitted to and received from the various radio units via the radiating cable.

BRIEF DESCRIPTION OF THE DRAWINGS

FIG. 2a is an indoor measurement of the co-polar field produced along the length, Z, of a Type 1 radiating cable, at a perpendicular distance $\zeta$ of 20 feet from the cable and at an operating frequency f of 1,850 MHz;

FIG. 2b is an indoor measurement of the co-polar field strength in dB versus frequency of a Type 1 radiating cable, at a distance z of 30 feet from the end of the cable and at a perpendicular distance $\zeta$ of 20 feet from the cable;

FIG. 2c is an indoor measurement of the cross-polar field produced along the length, Z, of a Type 1 radiating cable, at a perpendicular distance $\zeta$ of 20 feet from the cable and at an operating frequency f of 1,850 MHz;

FIG. 2d is an indoor measurement of the cross-polar field strength in dB versus frequency of a Type 1 radiating cable, at a distance z of 30 feet from the end of the cable and at a perpendicular distance $\zeta$ of 20 feet from the cable;

FIG. 7a is a near-field co-polar pattern produced by one example of the coaxial cable illustrated in FIG. 4, measured (indoors) along the length of the coaxial cable, at a distance 20 feet away from the coaxial cable, while operating at a fixed frequency of 1,700 MHz with an impedance-matching load connected to the far end of the coaxial cable;

FIG. 7aa is a near-field co-polar pattern measured under the same conditions as FIG. 7a but with a 3-foot metallic strip inserted on the dry-wall;

FIG. 7b is a measured (indoors) co-polar amplitude response of one example of the coaxial cable illustrated in FIG. 1, showing the radiated signal strength;

FIG. 7c is the corresponding measured cross-polar field (which is seen to be about 15 dB lower than the co-polar field of FIG. 7a);

FIG. 7d is the corresponding measured cross-polar field (which is seen to be about 15 dB lower than the co-polar field of FIG. 7b);

DETAILED DESCRIPTION OF PREFERRED EMBODIMENTS

Figure 1:
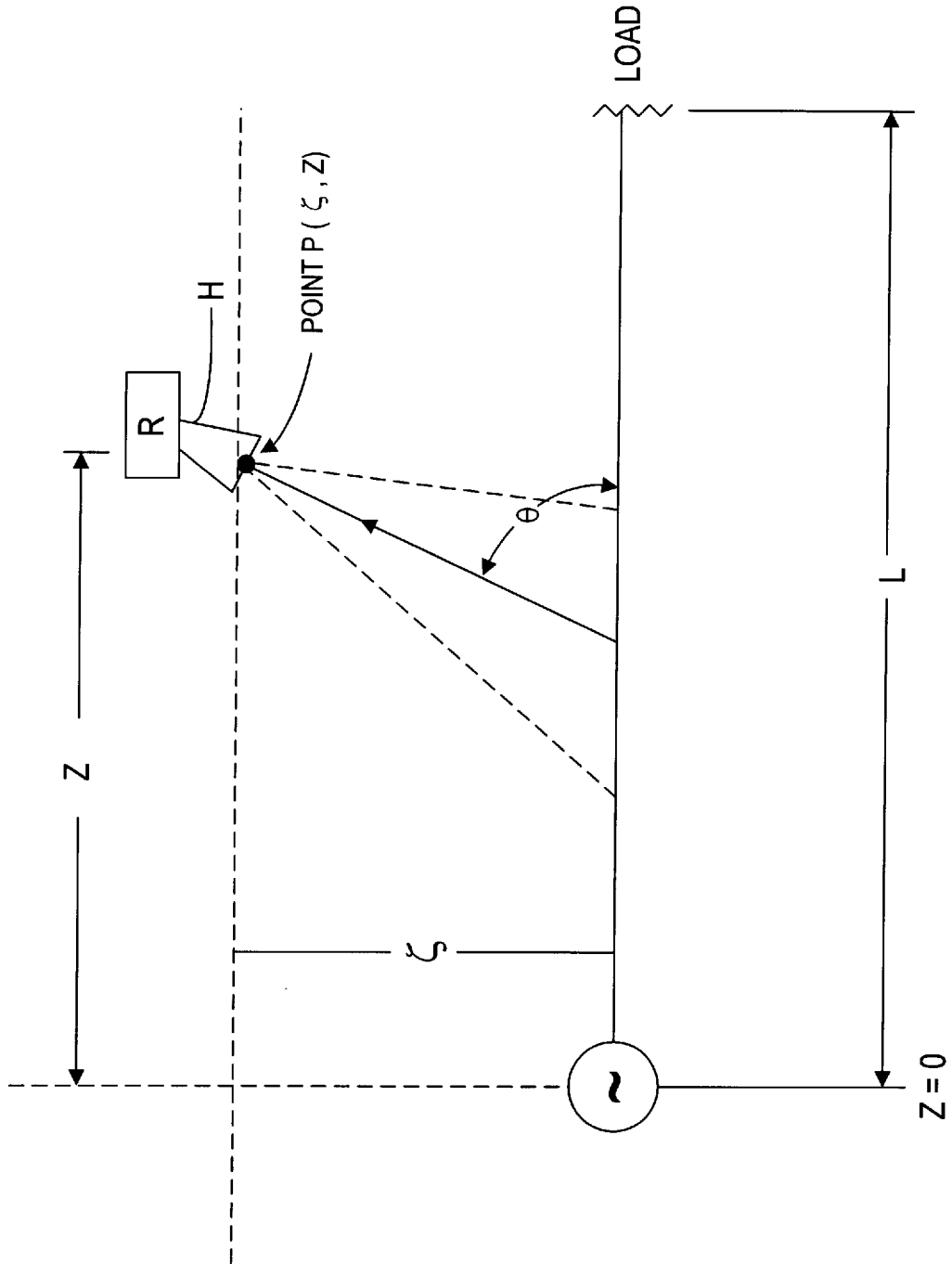
FIG. 1 is a diagrammatic illustration of the geometry of a radiating coaxial cable any associated receiving system operating at a frequency of f MHz.
Figure 3A:
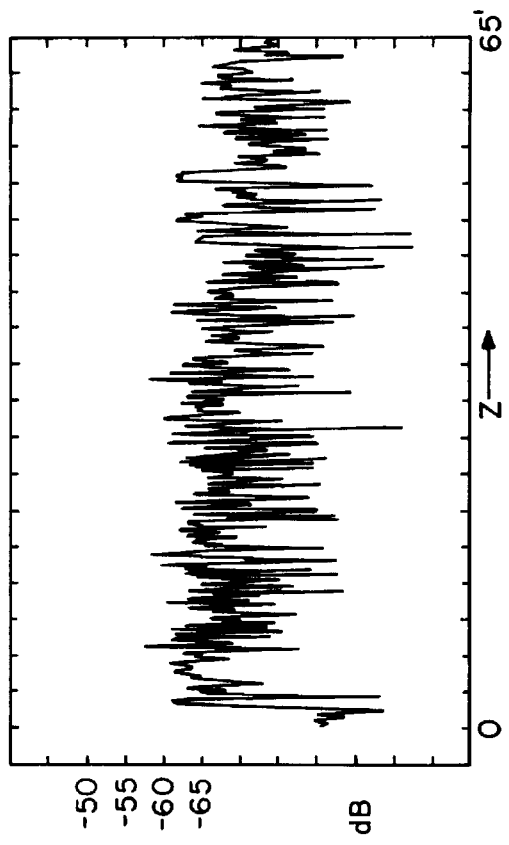
FIG. 3a is an indoor measurement of the co-polar field produced along the length, Z, of a Type 1 radiating cable, at a perpendicular distance $\zeta$ of 20 feet from the cable and at an operating frequency f of 1,850 MHz.
Figure 3B:
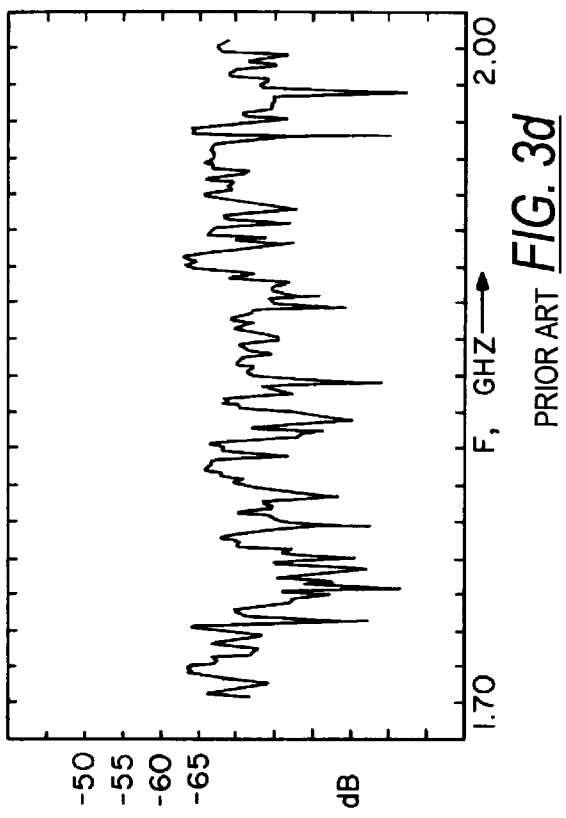
FIG. 3b is an indoor measurement of the co-polar field strength in dB versus frequency of a Type 1 radiating cable, at a distance z of 30 feet from the end of the cable and at a perpendicular distance $\zeta$ of 20 feet from the cable.
Figure 3C:
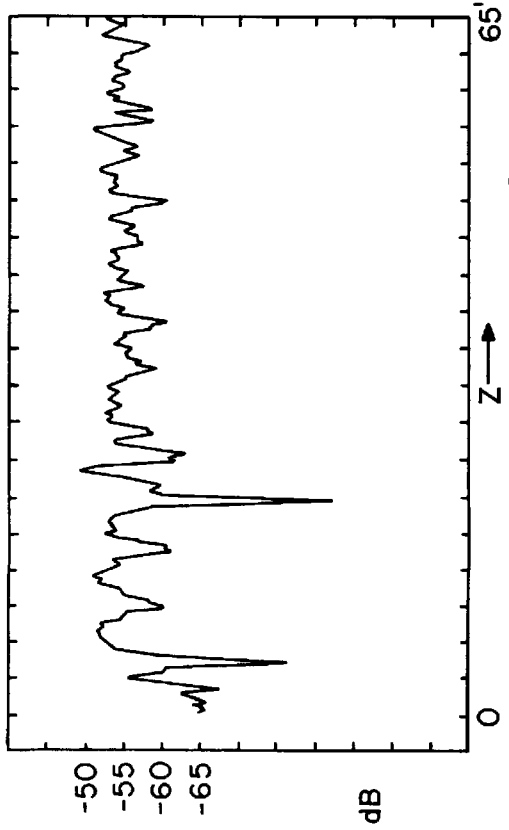
FIG. 3c is an indoor measurement of the cross-polar field produced along the length, Z, of a Type 1 radiating cable, at a perpendicular distance $\zeta$ of 20 feet from the cable and at an operating frequency f of 1,850 MHz.
Figure 3D:
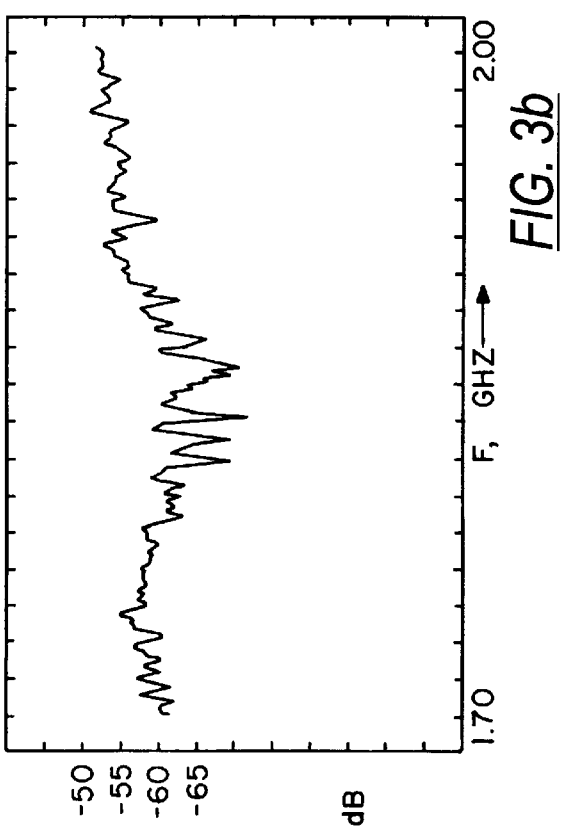
FIG. 3d is an indoor measurement of the cross-polar field strength in dB versus frequency of a Type 1 radiating cable, at a distance z of 30 feet from the end of the cable and at a perpendicular distance $\zeta$ of 20 feet from the cable.

While the invention is susceptible to various modifications and alternative forms, specific embodiments thereof have been shown by way of example in the drawings and will be described in detail herein. It should be understood, however, that it is not intended to limit the invention to the particular forms disclosed, but, to the contrary, the intention is to cover all modifications, equivalents and alternatives falling within the spirit and scope of the invention as defined by the appended claims.

Figure 4:
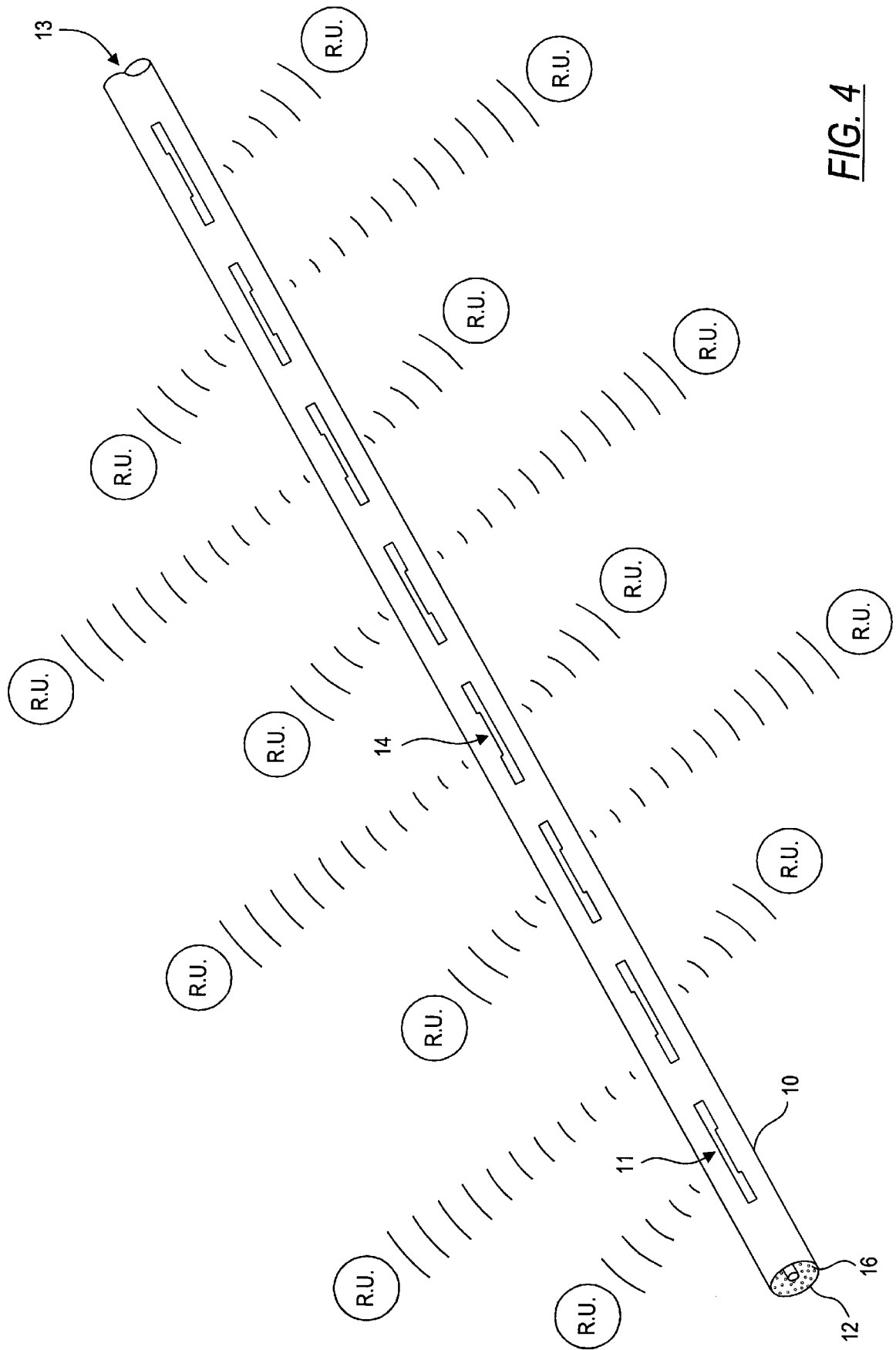
FIG. 4 is a perspective view of a radiating coaxial cable embodying the present invention, and associated radio units ("R.U.")
Figure 5:
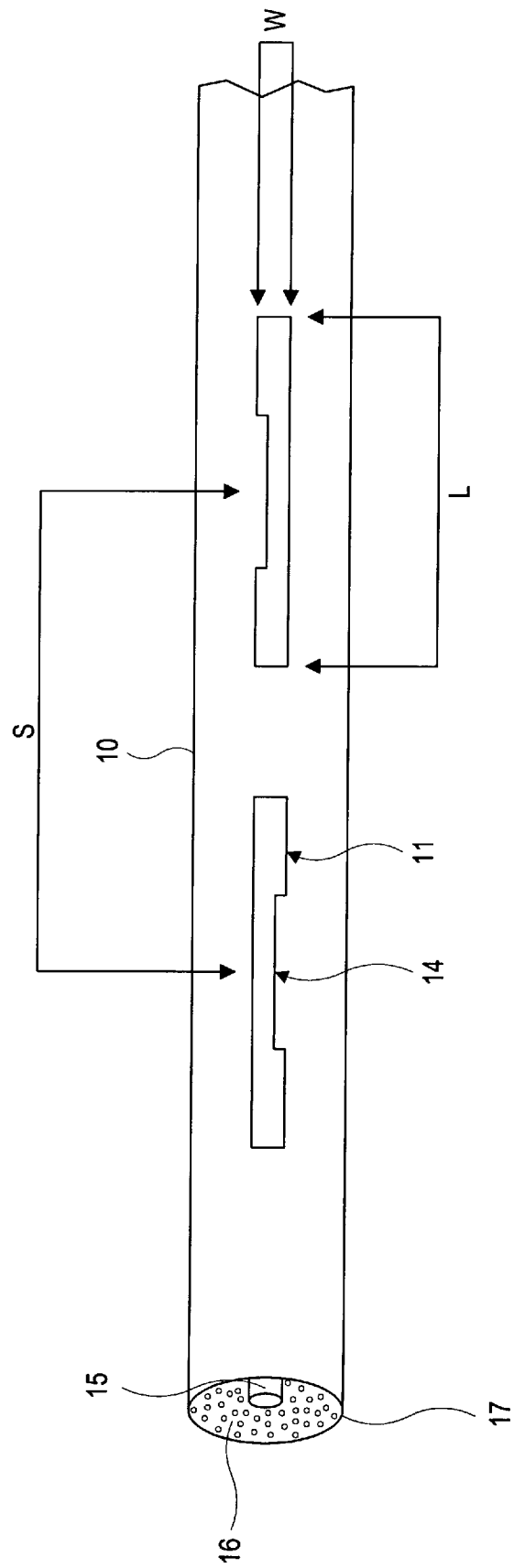
FIG. 5 is an enlarged view of a portion of the radiating cable of FIG. 4 showing the flush-coupling tab in the slots.

Referring now to the drawings, FIGS. 4 and 5 illustrate a length L of a radiating coaxial cable 10 having a series of off-resonant slots 11 formed in one side of the cable (or, perhaps, on two diametrically opposite sides, etc., to ensure the best performance independent of wall-mounting position). The cable 10 is a typical coaxial cable having an inner conductor 15 insulated from an outer conductor 17 by a dielectric material 16. As best seen in FIG. 1, a signal is fed into one end 12 of the cable 10 and propagated through the cable to a matched load 13 at the opposite end, a portion of the signal is radiated from the slots 11 along the entire length of the cable. The radiated field is polarized perpendicularly to the axis of the cable, and can be detected by radio units R.U. (see FIG. 4) anywhere along the length of the cable. The cable can also receive radiated signals from the radio units R.U. anywhere along the length of the cable. These received signals are propagated through the cable to a receiver (not shown) at the end 12 of the cable.

The radiating cable 10 may be used in a wide variety of different applications where multiple radio units R.U., often mobile units, must communicate with one or more base stations within a defined area. One example of such a system is a highway or railroad communication system in which the radiating cable extends along an open highway or railroad (or, also, in a tunnel) for constant communication with mobile radio units in the various vehicles on the open highway or railroad (or in the tunnel). Another example is a wireless local area network (WLAN) of personal computers, printers, servers and the like, located in a common building or on a common floor. This invention is most useful in applications where the communication area is sufficiently large that the radiating cable 10 must be at least 60 feet in length.

The dimensions, locations and configurations of the slots 11 in the cable 10 are selected to produce a substantially flat near-field pattern along the length of the cable, and across the operating bandwidth of the system. The near-field pattern of the radiating cable preferably varies by less than about ±3 dB over the operating bandwidth of the system and along the length of the cable. The bandwidth may be as high as that of the radiating cable (as defined below). To avoid the radiation of any significant cross-polarized fields, each slot 11 is oriented with its elongated edges parallel to the axis of the cable, and the transverse dimension of the slot is made narrow. For example, in a ⅞-inch cable carrying signals at a frequency of about 1.7 GHz, the slot width may be 0.200 inch. As the slot width is increased, the slot begins to radiate undesired cross-polarized fields of increasing strength.

Figure 6A:
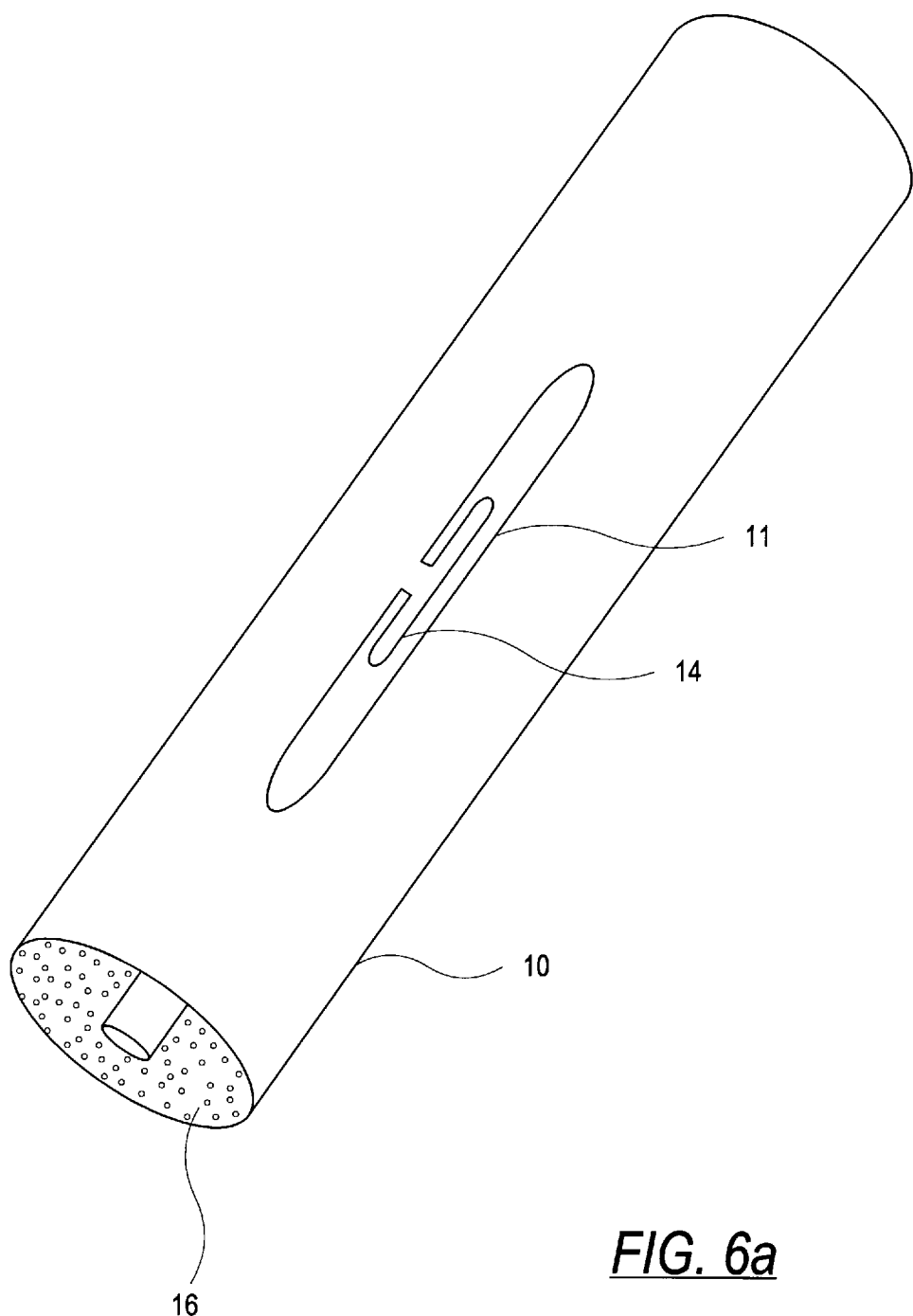
FIGS. 6a and 6b are enlarged views of alternative coupling tabs.
Figure 6B:
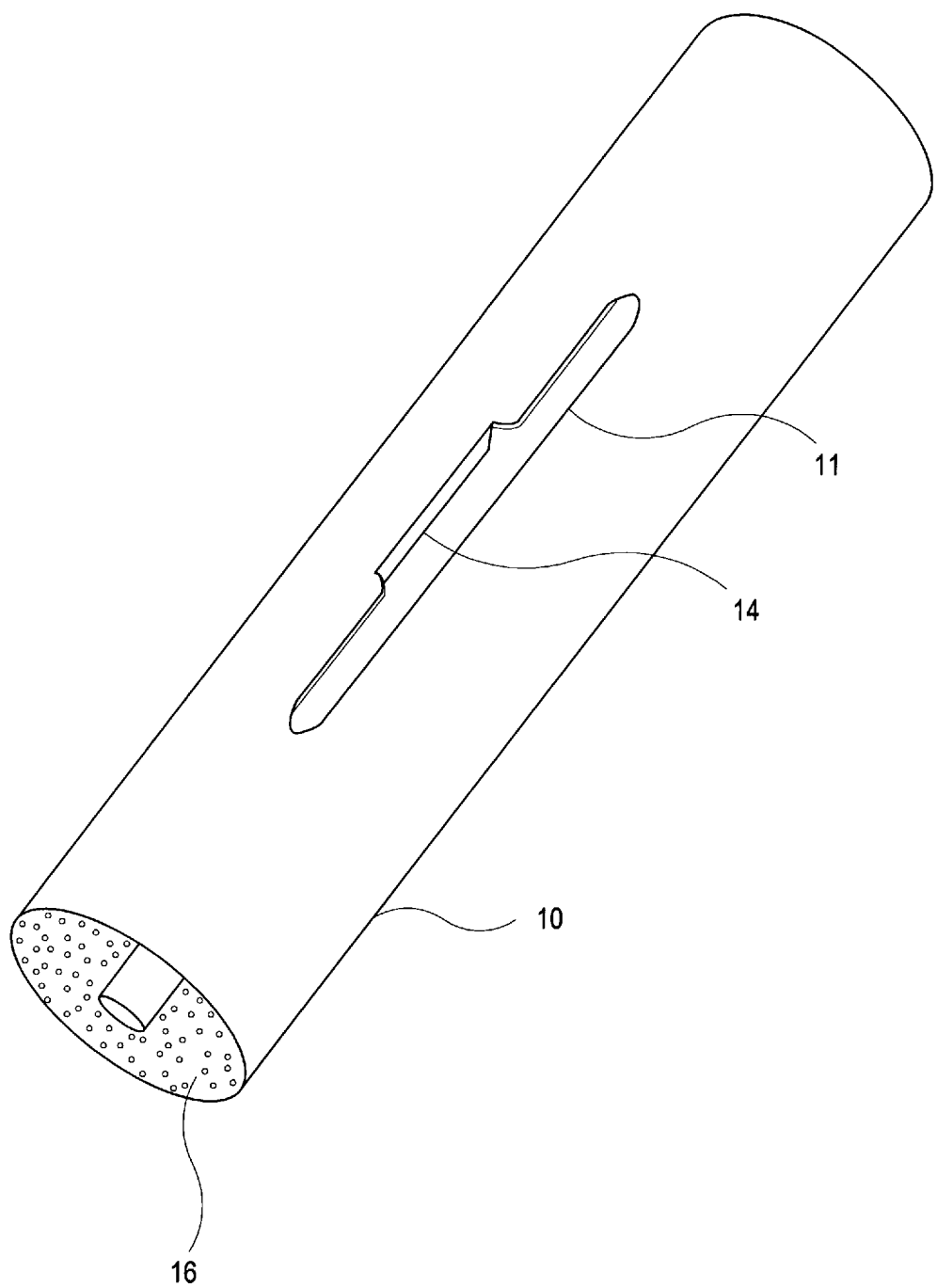

To cause each slot 11 to radiate energy from the interior of the coaxial cable 10, a coupling device such as a tab 14 of FIG. 5 (or, also, of FIG. 6a or FIG. 6b) is provided at each slot. FIG. 6a and FIG. 6b illustrate coaxial cables 10 with slots 11 and alternative shaped coupling tabs 14. For manufacturing convenience, it is preferred that the tabs 14 be formed as integral parts of the slot edges, in the central portion of one of the long edges of each slot. The tabs 14 may lie in the cylinder of the outer conductor of the cable, or the tabs may be bent into the interior of the cable for increased coupling. The phase of the slot's electric field is preferably reversed for successive slots 11 by forming the tabs 14 on alternating edges of successive slots, so that the tabs are on opposite edges of each pair of adjacent slots.

The dimensions of both the slots 11 and the tabs 14 are chosen to avoid any significant radiation attenuation of the signals that are propagated longitudinally through the cable, thereby ensuring that the signal is radiated with adequate strength along the entire length of the cable. Thus, the radiated energy per unit length of the cable, as well as the signal radiation-attenuation per unit length of the cable, are relatively low.

The slots 11 are all elongated in the axial direction, and the center-to-center spacing S is usually such that only a few slots are provided in each free space wavelength $\lambda$. The spacing, S, of the slots 11 determines the angle (s), $\hat{\Theta}$, of radiation from the cable, where, for the tabs on opposite edges of adjacent slots, this (these) angle(s) is (are) governed by the equation:

$$\cos \hat{\Theta}_n = -[(n+0.5)/(S/\lambda_v)] + (v/c)^{-1} \quad (1)$$

where n=0,1,2, ..., with n=0 being the first angle, n=1 the second, etc. Usually $S/\lambda_v$ is chosen small enough so that only one (the n=0) angle exists at a given $\lambda_v$ so as to insure the obtainment of a substantially "flat" near-field pattern along the length of the cable, since, if two or more angles exist at a given $\lambda$, it is difficult to obtain such a "flat" pattern unless the angles are sufficiently separated and the pick-up horn, H, has a sufficiently directive pattern. Similarly, if the tabs are all on the same edge of adjacent slots, this (these) angel(s) are governed by the equation:

$$\cos \hat{\Theta}_m = -[(m/(S/\lambda_v)] + (v/c)^{-1} \quad (2)$$

where m=1,2,3, ..., with m=1 being the first angle, m=2 the second, etc., and where in both (1) and (2) $\lambda_v$ is the free space wavelength, v is the phase velocity in the cable, and c is the speed of light, and where, again, $S/\lambda_v$ is usually chosen small enough so that only one angle exists at a given $\lambda_v$.

However, for either case, $S/\lambda_v$ must be large enough to ensure that at least one single beam exists. Examination of (1) then reveals (by considering the m=0 and m=1 cases at 180°) that for single beam operation one must choose:

$$0.5 [1+(v/c)^{-1}] \leq S/\lambda_v < 1.5[1+(v/c)^{-1}]^{-1} \quad (3)$$

for the reversed-tab case, and $$[1+(v/c)^{-1}]^{-1} \leq S/\lambda_v < 2[1+(v/c)^{-1}]^{-1} \quad (4)$$

for the non-reversed-tab case, respectively. As an example, if S=2.75" and v/c=0.89, and the reverse-tab option is chosen, then equation (1) and (3) reveal that as the frequency is increased from low values, a single beam initiates at a frequency, f, of 1,011 MHz (i.e., $S/\lambda_v$=0.2354) at an angle of $\hat{\Theta}_o$=180° and rotates with frequency, going down to 65.430° at f=3,033 MHz (i.e., $S/\lambda_v$=0.7063). Thus, a bandwidth of 3.033/1.011≈3:1 is available for single-beam operation, using the reverse-tab (which also follows from (3) by taking the ratio of the right-hand side over the left-hand side). Likewise, from (1) and (4), for the non-reversed-tab case a single beam initiates at f=2,022 MHz (i.e., $S/\lambda_v$=0.4708) at an angle of $\hat{\Theta}$=180° and goes down to 86.47° at f=4,044 MHz (i.e., $S/\lambda_v$=0.9416), i.e., provides only a 2:1 single-angle bandwidth (as also seen form (4)). Thus, reversing the tabs provides 3/2=1.5 times the bandwidth (for single beam operation) than does the non-reversed-tab case. Also, then, the reversed-tab case then has a smaller change in radiation angle, $\hat{\Theta}$, with frequency, which is desirable for a fixed-position "pick-up" horn.

The slot length L is chosen to achieve the desired amount of radiation from each slot (by controlling the amount of transverse displacement current across the slot), which in turn controls the radiation attenuation of the signal along the length of the cable. The width W of the slot is chosen narrow enough to minimize the amount of cross-polarized radiation from the slot.

It is usually preferred to have the angle $\hat{\Theta}$ near 90° so that the effective length of the cable has $Z_{start}$=0 and has an effective ending at Z=L, i.e., is the same as the cable's physical lengths so that the illuminated region corresponds to the cable's region. Examination of (1) and (2) then reveals that S/$\lambda$ should be chosen near $[2(v/c)]^{-1}$, (i.e., $S/\lambda_g$=½) for the reversed-tab case and near $(v/c)^{-1}$, (i.e., $S/\lambda_g$=1) for the non-reversed-tab case (though these exact $S/\lambda_g$ values should be avoided so as to not encounter "VSWR spikes)."

It is preferred to minimize sags and other curvatures in the coaxial cable, to minimize the production of oscillations in the near-field pattern. The coaxial cable can be made with an outer conductor that is sufficiently rigid to hold the cable relatively straight, or an otherwise flexible or semi-flexible cable may be reinforced with one or more longitudinal elements that provide sufficient stiffness to hold the cable relatively straight.

The radiating cable of this invention produces a substantially flat near-field pattern close to cable as well as at substantial distances from the cable. The cable can be mounted directly on a wall (preferably with its non-slotted side against the wall) or other surface so that it is not vulnerable to mechanical vibrations, air-vortex and physical damage.

FIG. 7a is a plot of the coupling loss (co-polar) in db measured along the length z of a coaxial cable having an outer conductor with an outside diameter of ⅞ inch and a single row of slots extending along the length of the cable with a center-to-center spacing, S, of 2.75 inches. Each slot was 2 inches long (l=2.00") and 0.200 inch wide (w=0.200"), with an inwardly extending tab formed in the center of one of the long edges of each slot. The slot edges forming the tabs alternated along the length of the cable, so that the tabs were on opposite edges of each pair of adjacent slots. Each tab was 0.910 inch long (in the axial direction) and 0.083 inch wide (in the circumferential direction). The cable was 65 feet in length and was operated at a frequency of 1,700 Mhz ($\lambda$=6.948") with $\zeta$=20 feet, where $\zeta$ is the perpendicular distance between the measured field point and the cable axis. It can be seen that the coupling loss was substantially flat, within about ±3 dB, along the entire length of the cable. FIG. 7c is a near-field cross-polar pattern produced by one example of the coaxial cable illustrated in FIG. 4, measured (indoors) along the length of the coaxial cable, while operating at a fixed frequency of 1,700 MHz with an impedance-matching load connected to the far end of the coaxial cable. The measured cross-polar near field (FIG. 7c) was about 15 db below the co-polar near field, and this low cross-polarization level is the reason for the excellent "flat" co-polar response. All these patterns were measured with a pyramidal "pick-up" horn oriented with its axis at an angle of 95° (±10°) to the cable axis (since, here, $S/\lambda_v$=2.75/6.948=0.396, and v/c=0.89, so from (1), $\hat{\Theta}$=98°).

Because the radiating cable described above has a substantially flat near-field pattern, it provides reliable communications to and from radio units distributed along the length of the cable of FIG. 4. This reliability is particularly useful in digital communications because it permits the attainment of low BERs. For example, digital data communications may require BERs as low as $10^{-8}$ to avoid loss of significant data. These low BERs are attainable with a substantially flat near-field pattern because the fluctuations, or oscillations, in the pattern are of such a small amplitude that losses of one or more bits of data are virtually non-existent. The substantially flat near-field patterns of the present invention are also desirable for analog communication signals, to avoid spurious distortions in the analog signals.

FIG. 7aa is the near-field co-polar pattern measured under the same conditions as FIG. 7a (both with the non-slotted side against the wall) but with a 3-foot metallic strip inserted on the dry-wall (the fact that FIG. 7aa is virtually identical to FIG. 7a indicates that no TWLE exists for this coaxial cable radiator).

FIG. 7b illustrates the measured co-polar frequency response of the coaxial cable described above, across the operating bandwidth of the system. The amplitude of the radiated signal was measured at a point 20 feet ($\zeta$=20 feet) laterally away from the coaxial cable and 30 feet axially (z=30 feet) from the coaxial cable end connected to the signal generator. The frequency of the signal generator was swept across the frequency band of 1.700 to 1,850 GHz, which is the typical operating bandwidth of this coaxial cable for emanating angles of $92°\leq\hat{\Theta}\leq98°$ (the predicted response for this case is a straight line, with a slight negative slope, passing through the approximate center of the measured response). The coaxial cable slot had the same dimensions and location described above. It can be seen that the measured signal amplitude was substantially flat (±2.5 dB) across the frequency band. The "pick-up" horn's axis was at an angle of 95° (a value between 92° and 98°) (±10°) to the coaxial cable's axis.

FIG. 7d is a measured (indoors) cross-polar amplitude response of one example of the coaxial cable illustrated in FIG. 1, showing the radiated signal strength measured at a fixed point spaced 20 feet laterally and 30 feet axially away from the coaxial cable while the frequency of the transmitted signal was swept across the entire operating bandwidth of 1,700 through 1,850 MHz.

FIG. 7d again shows the low level (–15 dB or less) of cross-polarization.

Figure 8A:
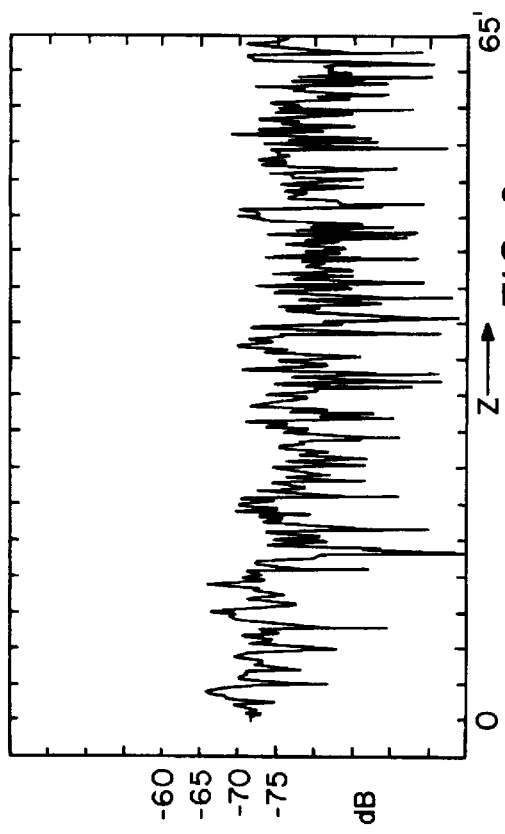
FIG. 8a is a near-field co-polar pattern produced by the same coaxial cable that produced the pattern of FIG. 7a; likewise.
Figure 8B:
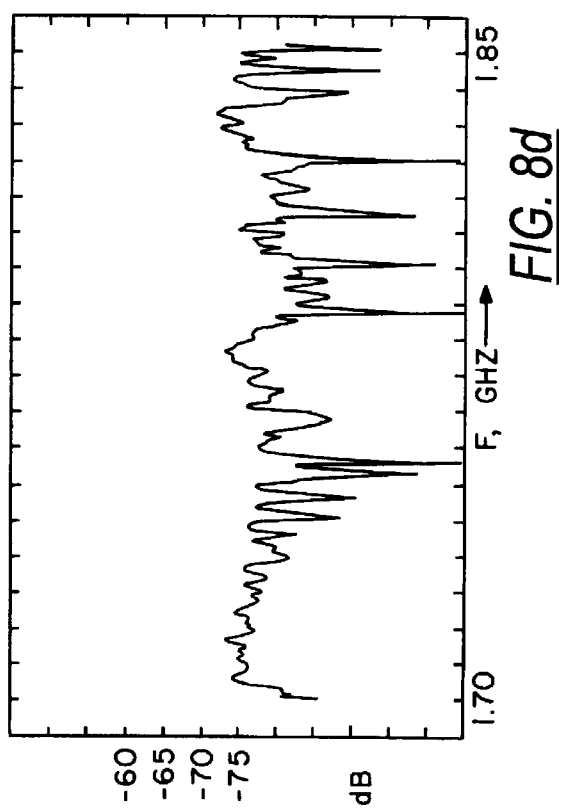
FIG. 8b is a measured amplitude response of the same coaxial cable, that produced the pattern of FIG. 7a; likewise.
Figure 8C:
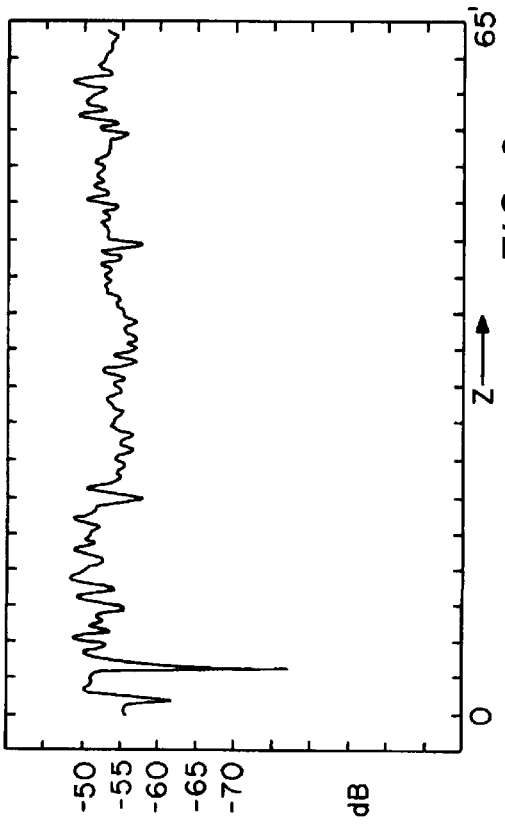
FIG. 8c is the corresponding cross-polar field measured.
Figure 8D:
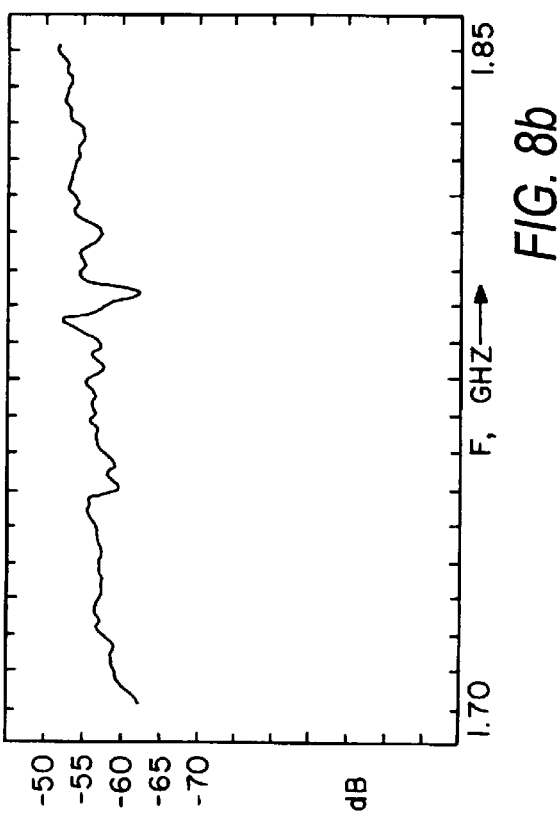
FIG. 8d is the corresponding cross-polar field measured. Note that all the above measured patterns have a 0 dB reference level corresponding to that of the Radio Unit being disconnected from the "pick-up" horn and connected directly to the load-end 13 of the cable (in place of the usual terminating load)

FIGS. 8a through 8d are measurements like those of FIGS. 7a through 7d, but taken at a distance of 5 feet from the coaxial cable. It can be seen that the curves in FIGS. 8a and 8b are about as flat as than those in FIGS. 7a and 7b, and FIGS. 8c and 8d again show –15 dB cross polarization.

Because the radiating coaxial cable described above has a substantially flat near-field pattern, it provides reliable communications to and from radio units distributed along the length of the coaxial cable of FIG. 4. This reliability is particularly useful in digital communications because it permits the attainment of low BERs. For example, digital data communications may require BERs as low as $10^{-8}$ to avoid loss of significant data. These low BERs are attainable with a substantially flat near-field pattern because the fluctuations, or oscillations, in the pattern are of such a small amplitude that losses of one or more bits of data are virtually non-existent. The substantially flat near-field patterns of the present invention are also desirable for analog communication signals, to avoid distortions in the analog signals.

The slotted coaxial cable 10 preferably has a main beam radiation angle $\hat{\Theta}$ in the approximate range of 92° to 98°, since this angular range is near 90° so as to have the effective length (illuminated region) substantially the same as the physical length of the cable. As seen from above, this corresponds to a frequency bandwidth of 1.85/1.70=1.09, or about 9%.

To increase the bandwidth beyond this range, an appropriate change (decrease) in slot spacing and slot length can be made and yet realize single beam operation, but now covering a larger angular range. Thus, operation from 1.700 to 2.500 GHz (a 47% bandwidth), for example, can be realized by making S=2.00" and $\iota$=1.50" and the angular range becomes (from (1)) $93°\leq\Theta_0\leq128°$. This is still a sufficiently small angular range (128–93=35°) so the "pick-up" horn can be set at $\Theta \doteq 110°$ since the horn's directivity does not degrade substantially over $\pm(35/2)\doteq\pm17°$ about this setting.

The radio units that receive radiated signals from the coaxial cable preferably include a directive antenna, such as the pyramidal horn mentioned above, having an aperture that is substantially perpendicular (e.g., within plus or minus 10 degrees) to the axis of the main radiation beam from the coaxial cable. This antenna preferably has a directive gain of at least about 10 dBi, and is positioned to receive radiation from at least about a 10-foot length of the coaxial cable. Other directive antennas are parabolic reflectors, corner reflectors, and slot or dipole arrays.

It is also noted that the magnitude of the fluctuations that exist at the ends of effective length (see FIGS. 7a and 8a) can be minimized by having the first and last 10' to 20' sections of the radiating cable made with smaller slots (or tabs) to decrease their coupling (i.e., decrease the amount of energy radiated from these sections).

Figure 9A:
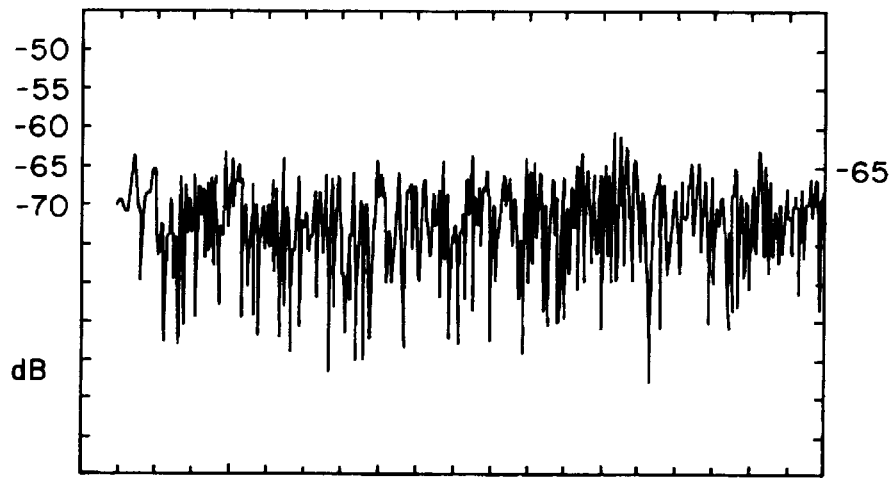
FIG. 9a is a near-field co-polar pattern produced by a Type 1 radiating cable at 1,850 GHz with a simple vertical dipole "pick-up" antenna.
Figure 9B:
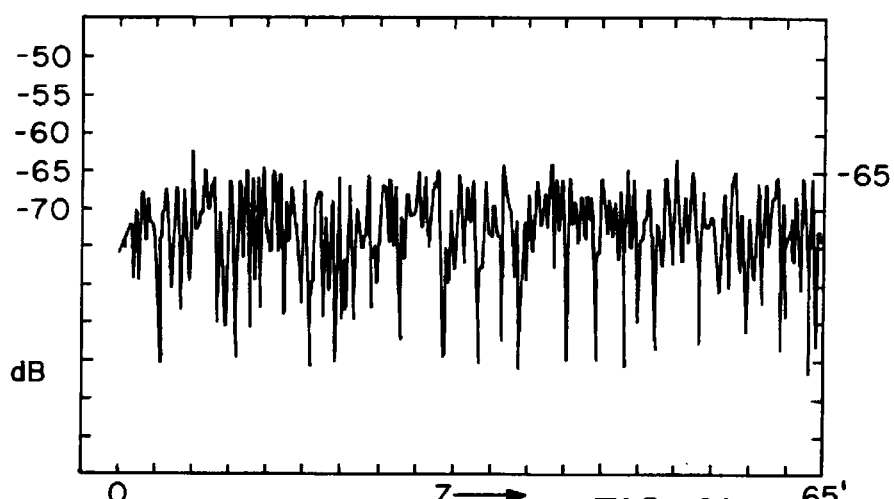
FIG. 9b is a near-field co-polar pattern produced by a Type 3 radiating cable at 1,850 GHz with a simple vertical dipole "pick-up" antenna.
Figure 9C:
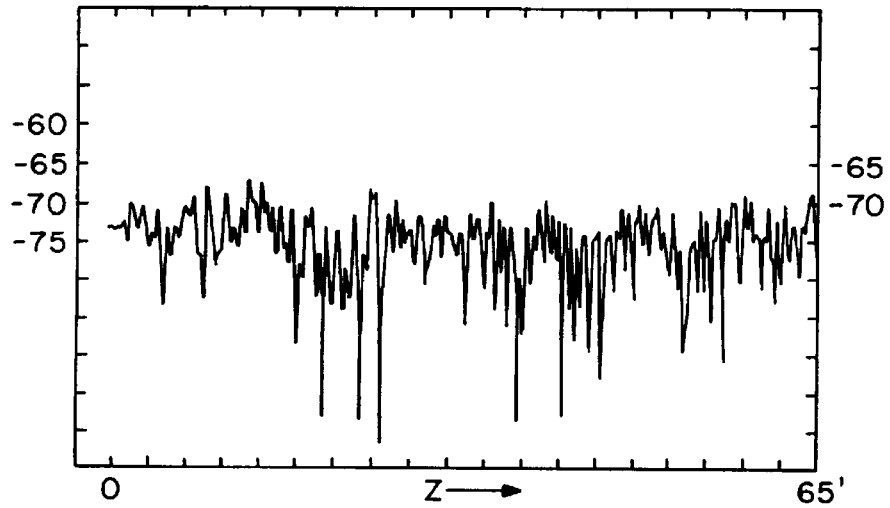
FIG. 9c is a near-field co-polar pattern produced by the cable of this invention at 1,850 GHz with a simple dipole "pick-up" antenna.
Figure 10:
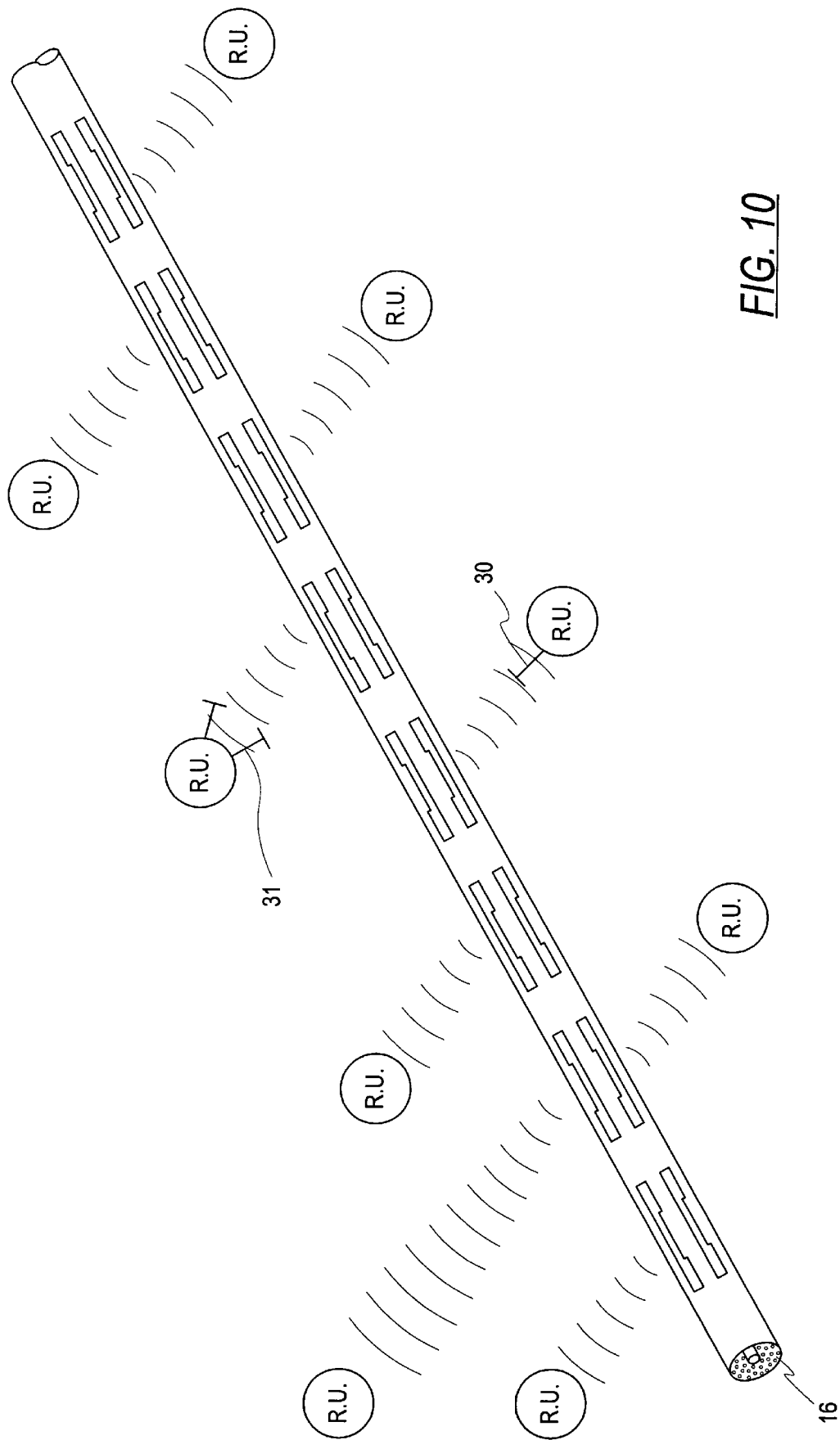
FIG. 10 is a perspective view of a radiating coaxial cable with two rows of slots embodying the present invention, and associated radio units ("R.U.").

It is also noted that in some applications (e.g., some low cost cellular radio systems using TDMA) it may be acceptable to tolerate less than optimum performance, where optimum performance is that achieved with a highly directive "pick-up" horn (one with about 15 dBi; or more directive-gain and a good front-to-back ratio of about 18 dB or higher) to achieve responses like FIG. 7a (and 7b). In this case, a simple quarter-wave (dipole) antenna 30 (see FIG. 10) (or two of them arranged in a space-diversity arrangement) 31 (see FIG. 10) may suffice to give an adequately low BER ratio (where the BER is, of course, improved (reduced) using the above type optimum "pick-up" horn). Now, even in this circumstance, the subject radiating coaxial cable gives superior performance to any other known types because of its lower cross-polar fields. This is shown by FIGS. 9a, 9b and 9c, where FIG. 9a is a measured response for the first type above, FIG. 9b for the third type, and FIG. 9c for the cable of this invention (where these figures show the dB coupling at $\zeta=20'$ as a function of Z for $0 \leq Z \leq 65'$ using a simple vertical dipole "pick-up" antenna), since FIG. 9c has significantly fewer severe dips in coupling. (In passing, one notes the significant improvement by using a directive "pick-up" horn, by comparing FIG. 7a with FIG. 9c for the subject cable.)

We claim:

1. A radiating coaxial cable having a longitudinal axis and adapted for use in communication systems requiring long lengths of cable, said cable comprising an elongated smooth-surfaced, cylindrical inner conductor having a longitudinal axis, the axis of said inner conductor defining the axis of the cable, a dielectric material surrounding the inner conductor, a continuous outer conductor surrounding the dielectric in direct contact therewith and spaced from said inner conductor, said outer conductor forming at least one row of straight axially extending slots comprising elongated edges and located and dimensioned to produce a radiated field polarized perpendicularly to the axis of the cable when said cable is fed with electromagnetic energy, said slots also being configured, to substantially avoid the radiation of a field polarized parallel to the axis of the cable, and to avoid any significant radiation-attenuation of signals propagated longitudinally through the cable, said slots being spaced from each other by a center-to-center slot spacing which is a maximum of one-half free-space wave length, and a respective tab comprising an integral part of a respective one of said elongated edges of each slot for coupling energy between a space inside said outer conductor and the slots so that said energy is radiated outside said outer conductor.

2. The radiating coaxial cable of claim 1 wherein each of said elongated edges of said slots is substantially parallel to the axis of the cable.

3. The radiating coaxial cable of claim 1 wherein said radiated energy produces a near-field, and the dimensions and locations of the slots in the outer conductor produce a substantially flat frequency response in the near field at any point along a length of the cable.

4. The radiating coaxial cable of claim 1 wherein said radiated energy produces a near-field, and the dimensions and locations of the slots in the outer conductor are selected to produce a near-field pattern having an amplitude that is substantially constant, at a given frequency, along a length of the cable.

5. The radiating coaxial cable of claim 1 wherein each of said slots is rectangular.

6. The radiating coaxial cable of claim 1 wherein said outer conductor forms a plurality of rows of longitudinally spaced slots, the slots in each row being spaced to radiate signals in a selected frequency band.

7. A method of communicating among a multiplicity of radio units selected from the group consisting of transmitters, receivers, and transceivers located within a prescribed area, said method comprising locating an elongated coaxial cable having a longitudinal axis within or adjacent to said prescribed area for transmitting radiated signals to, and receiving radiated signals from, said multiplicity of radio units along a length of the cable, via said cable and producing a radiated field polarized perpendicularly to the axis of the cable, and having a near field encompassing the prescribed area containing the multiplicity of radio units, said cable comprising an elongated smooth-surfaced, cylindrical inner conductor having a longitudinal axis, the axis of said inner conductor defining the axis of the cable, a dielectric material surrounding the inner conductor, a continuous outer conductor surrounding the dielectric in direct contact therewith and spaced from said inner conductor, said outer conductor forming at least one row of straight axially extending slots comprising elongated edges and located and dimensioned to produce a radiated field polarized perpendicularly to the axis of the cable when said cable is fed with electromagnetic energy, said slots also being configured, to substantially avoid the radiation of a field polarized parallel to the axis of the cable, and to avoid any significant radiation-attenuation of signals propagated longitudinally through the cable, said slots being spaced from each other by a center-to-center slot spacing which is a maximum of one-half free-space wave length, and a respective tab comprising an integral part of a respective one of said elongated edges of each slot for coupling energy between a space inside said outer conductor and the slots so that said energy is radiated outside said outer conductor, and producing a substantially flat frequency response in the near field along a length of the cable.

8. The method of claim 7 wherein each of said slots is formed so as to be elongated in the direction of the axis of the cable.

9. The method of claim 7 wherein said frequency response produced by said dimensions and locations of said slots in said cable is substantially flat over the bandwidth of said cable.

10. The method of claim 7 wherein said frequency response produced by said dimensions and locations of said slots in said cable is substantially flat over the operating bandwidth of said radio units.

11. The method of claim 7 wherein the amplitude of said near-field pattern fluctuates by less than about ±3 dB.

12. The method of claim 7 wherein said cable is at least about 60 feet in length.

13. The method of claim 7 wherein said tabs of successive slots are located on alternating elongated edges of the slots, and the center-to-center slot spacing, S, in the longitudinal direction is about $\lambda_g/2$ so that the constant phase front produced makes an angle of about 90° to the cable, where $\lambda_g$ is the wavelength of said signals inside the cable.

14. A method of communicating among a multiplicity of radio units selected from the group consisting of transmitters, receivers, and transceivers, said method comprising locating an elongated coaxial cable having a longitudinal axis within or adjacent to said prescribed area for transmitting radiated signals to, and receiving radiated signals from, said multiplicity of radio units along a length of the cable, via said cable and producing a radiated field polarized perpendicularly to the axis of the cable, and having a near field encompassing the prescribed area containing the multiplicity of radio units, said cable comprising an elongated smooth-surfaced, cylindrical inner conductor having a longitudinal axis, the axis of said inner conductor defining the axis of the cable, a dielectric material surrounding the inner conductor, a continuous outer conductor surrounding the dielectric in direct contact therewith and spaced from said inner conductor, said outer conductor forming at least one row of straight axially extending slots comprising elongated edges and located and dimensioned to produce a radiated field polarized perpendicularly to the axis of the cable when said cable is fed with electromagnetic energy, said slots also being configured, to substantially avoid the radiation of a field polarized parallel to the axis of the cable, and to avoid any significant radiation-attenuation of signals propagated longitudinally through the cable, said slots being spaced from each other by a center-to-center slot spacing which is a maximum of one-half free-space wave length, and a respective tab comprising, an integral part of a respective one of said elongated edges of each slot for coupling energy between a space inside said outer conductor and the slots so that said energy is radiated outside said outer conductor, and producing a near-field pattern having an amplitude that is substantially constant, at a given frequency, along a length of the cable.

15. The method of claim 14 wherein said cable is at least about 60 feet in length.

16. The method of claim 14 wherein said respective tabs of successive slots are located on alternating elongated edges of corresponding slots, and the center-to-center slot spacing, S, in the direction of said longitudinal axis of the cable is about $\lambda_g/2$ so that the constant phase front produced makes an angle of about 90° to the cable, where $\lambda_g$ is the wavelength of said signals inside the cable.

17. The method of claim 14 wherein the amplitude of said near-field pattern fluctuates by less than about ±3 dB.

18. A digital communication system having the capability of two-way transmission of digital signals at high data rates with negligible bit error rates, said system comprising a multiplicity of radio units selected from the group consisting of transmitters, receivers, and transceivers located within a prescribed area, an elongated coaxial cable having a longitudinal axis and located within or adjacent to said prescribed area for transmitting radiated signals to, and receiving radiated signals from, said multiplicity of radio units along a length of the cable, said cable comprising an elongated smooth-surfaced, cylindrical inner conductor having a longitudinal axis, the axis of said inner conductor defining the axis of the cable, a dielectric material surrounding the inner conductor, a continuous outer conductor surrounding the dielectric in direct contact therewith and spaced from said inner conductor, said outer conductor forming at least one row of straight axially extending slots comprising elongated edges and located and dimensioned to produce a radiated field polarized perpendicularly to the axis of the cable when said cable is fed with electromagnetic energy, said slots also being configured, to substantially avoid the radiation of a field polarized parallel to the axis of the cable, and to avoid any significant radiation-attenuation of signals propagated longitudinally through the cable, said slots being spaced from each other by a center-to-center slot spacing which is a maximum of one-half free-space wave length, and a respective tab comprising an integral part of a respective one of said elongated edges of each slot for coupling energy between a space inside said outer conductor and the slots so that said energy is radiated outside said outer conductor, the cable producing a near field encompassing the prescribed area containing the multiplicity of radio units, and having a near-field pattern having an amplitude that is substantially constant, at a given frequency, along a length of the cable.

19. The system of claim 18 wherein each of said radio units includes a pair of dipole antennas in a space-diversity arrangement.

20. The system of claim 18 wherein said multiplicity of radio units include directive horn antennas for transmitting and receiving said radiated signals.

21. The system of claim 18 wherein said multiplicity of radio units include dipole antennas for transmitting and receiving said radiated signals.

22. A method of communicating among a multiplicity of radio units selected from the group consisting of transmitters, receivers, and transceivers said method comprising locating an elongated coaxial cable having a longitudinal axis within or adjacent to said prescribed area for transmitting radiated signals to, and receiving radiated signals from, said multiplicity of radio units along a length of the cable, via said cable and producing a radiated field polarized perpendicularly to the axis of the cable, and having a near field encompassing the prescribed area containing the multiplicity of radio units, said cable comprising an elongated smooth-surfaced, cylindrical inner conductor having a longitudinal axis, the axis of said inner conductor defining the axis of the cable, a dielectric material surrounding the inner conductor, a continuous outer conductor surrounding the dielectric in direct contact therewith and spaced from said inner conductor, said outer conductor forming at least one row of straight axially extending slots comprising elongated edges and located and dimensioned to produce a radiated field polarized perpendicularly to the axis of the cable when said cable is fed with electromagnetic energy, said slots also being configured, to substantially avoid the radiation of a field polarized parallel to the axis of the cable, and to avoid any significant radiation-attenuation of signals propagated longitudinally through the cable, said slots being spaced from each other by a center-to-center slot spacing, S, in the direction of said longitudinal axis of the cable is about $\lambda_g$ so that the constant phase front produced makes an angle of about 90° to the cable, where $\lambda_g$ is the wavelength of said signals inside the cable, and a respective tab comprising an integral part of a respective one of said elongated edges of each slot for coupling energy between a space inside said outer conductor and the slots so that said energy is radiated outside said outer conductor, said respective tabs of successive slots being located on the same elongated edges of corresponding slots, and producing a near-field pattern having an amplitude that is substantially constant, at a given frequency, along a length of the cable.

23. A method of communicating among a multiplicity of radio units selected from the group consisting of transmitters, receivers, and transceivers located within a prescribed area, said method comprising locating an elongated coaxial cable having a longitudinal axis within or adjacent to said prescribed area for transmitting radiated signals to, and receiving radiated signals from, said multiplicity of radio units along a length of the cable, via said cable and producing a radiated field polarized perpendicularly to the axis of the cable, and having a near field encompassing the prescribed area containing the multiplicity of radio units, said cable comprising an elongated smooth-surfaced, cylindrical inner conductor having a longitudinal axis, the axis of said inner conductor defining the axis of the cable, a dielectric material surrounding the inner conductor, a continuous outer conductor surrounding the dielectric in direct contact therewith and spaced from said inner conductor, said outer conductor forming at least one row of straight axially extending slots comprising elongated edges and located and dimensioned to produce a radiated field polarized perpendicularly to the axis of the cable when said cable is fed with electromagnetic energy, said slots also being configured, to substantially avoid the radiation of a field polarized parallel to the axis of the cable, and to avoid any significant radiation-attenuation of signals propagated longitudinally through the cable, said slots being spaced from each other by a center-to-center slot spacing, S, in the direction of said longitudinal axis of the cable, that is about $\lambda_g$ so that the constant phase front produced makes an angle of about 90° to the cable, where $\lambda_g$ is the wavelength of said signals inside the cable, and a respective tab comprising an integral part of a respective one of said elongated edges of each slot for coupling energy between a space inside said outer conductor and the slots so that said energy is radiated outside said outer conductor, said tabs of successive slots being located on the same elongated edges of the slots, and producing a substantially flat frequency response in the near field along a length of the cable.

24. A digital communication system having the capability of two-way transmission of digital signals at high data rates with negligible bit error rates, said system comprising a multiplicity of radio units selected from the group consisting of transmitters, receivers, and transceivers located within a prescribed area, an elongated coaxial cable having a longitudinal axis and located within or adjacent to said prescribed area for transmitting radiated signals to, and receiving radiated signals from, said multiplicity of radio units along a length of the cable, said cable comprising an elongated smooth-surfaced, cylindrical inner conductor having a longitudinal axis, the axis of said inner conductor defining the axis of the cable, a dielectric material surrounding the inner conductor, a continuous outer conductor surrounding the dielectric in direct contact therewith and spaced from said inner conductor, said outer conductor forming at least one row of straight axially extending slots comprising respective elongated edges and located and dimensioned to produce a radiated field polarized perpendicularly to the axis of the cable when said cable is fed with electromagnetic energy, said slots also being configured, to substantially avoid the radiation of a field polarized parallel to the axis of the cable, and to avoid any significant radiation-attenuation of signals propagated longitudinally through the cable, said slots being spaced from each other by a center-to-center slot spacing which is a maximum of one-half free-space wave length, and a respective tab comprising an integral part of a respective one of said elongated edges of each slot for coupling energy between a space inside said outer conductor and the slots so that said energy is radiated outside said outer conductor, the cable producing a near field encompassing the prescribed area containing the multiplicity of radio units, and having a substantially flat frequency response in the near field along a length of the cable.

25. The system of claim 24 wherein said multiplicity of radio units include directive horn antennas for transmitting and receiving said radiated signals.

26. The system of claim 24 wherein said multiplicity of radio units include dipole antennas for transmitting and receiving said radiated signals.

27. The system of claim 24 wherein each of said multiplicity of radio units includes a pair of dipole antennas in a space-diversity arrangement.

* * * * *